United States Patent
Stephanou

(10) Patent No.: US 7,530,302 B2
(45) Date of Patent: May 12, 2009

(54) INTERCHANGEABLE MULTI-PURPOSE COOKING APPARATUS

(76) Inventor: Antonakis Manolis Stephanou, 19 Lobengula Road, Southerton, Harare (ZW)

( * ) Notice: Subject to any disclaimer, the term of this patent is extended or adjusted under 35 U.S.C. 154(b) by 749 days.

(21) Appl. No.: 10/499,483

(22) PCT Filed: Aug. 20, 2001

(86) PCT No.: PCT/AP01/00001

§ 371 (c)(1),
(2), (4) Date: Jun. 18, 2004

(87) PCT Pub. No.: WO03/015595

PCT Pub. Date: Feb. 27, 2003

(65) Prior Publication Data

US 2005/0034609 A1    Feb. 17, 2005

(51) Int. Cl.
*A47J 37/00*    (2006.01)
*A47J 27/00*    (2006.01)
(52) U.S. Cl. .............................. 99/339; 99/340; 99/357; 99/417; 99/449
(58) Field of Classification Search .............. 99/340, 99/339, 449, 417, 413, 357; 126/25 R, 9 R, 126/4

See application file for complete search history.

(56) References Cited

U.S. PATENT DOCUMENTS

| | | | | | |
|---|---|---|---|---|---|
| 1,992,843 | A | * | 2/1935 | Serenberg et al. | 219/452.13 |
| 2,419,674 | A | * | 4/1947 | Caplan | 99/339 |
| 3,289,571 | A | * | 12/1966 | Lewus | 99/339 |
| 4,430,559 | A | * | 2/1984 | Rabay | 219/449.1 |
| 5,524,610 | A | * | 6/1996 | Clark | 126/682 |
| 5,552,577 | A | * | 9/1996 | Su | 219/401 |
| 5,782,165 | A | * | 7/1998 | Glenboski et al. | 99/340 |
| 6,073,542 | A | * | 6/2000 | Perez | 99/340 |
| 6,123,010 | A | * | 9/2000 | Blackstone | 99/284 |
| 6,196,115 | B1 | * | 3/2001 | Tsao | 99/339 |

* cited by examiner

*Primary Examiner*—Reginald L Alexander
(74) *Attorney, Agent, or Firm*—Ladas and Parry LLP

(57) ABSTRACT

The interchangeable multi-purpose cooking apparatus may be used as a normal stove, a grill, a frying pan, a barbecue, a baker, a steamer, a poacher, a chip fryer, a fondue or a Chinese wok. With some small modifications it can be used as a pressure cooker or even as a lighting device or a heater. This portable apparatus consists of a heating pan (1) and a cooking pan (2) which fits into the heating pan and accessories which allows it to carry out the various cooking operations. The heating unit is a heating pan comprising a heating mechanism and insulation for protection. The heating mechanisms are mutually interchangeable. The heating pan, when upside down fits upon the cooking pan, so that they are also in interchangeable positions.

9 Claims, 10 Drawing Sheets

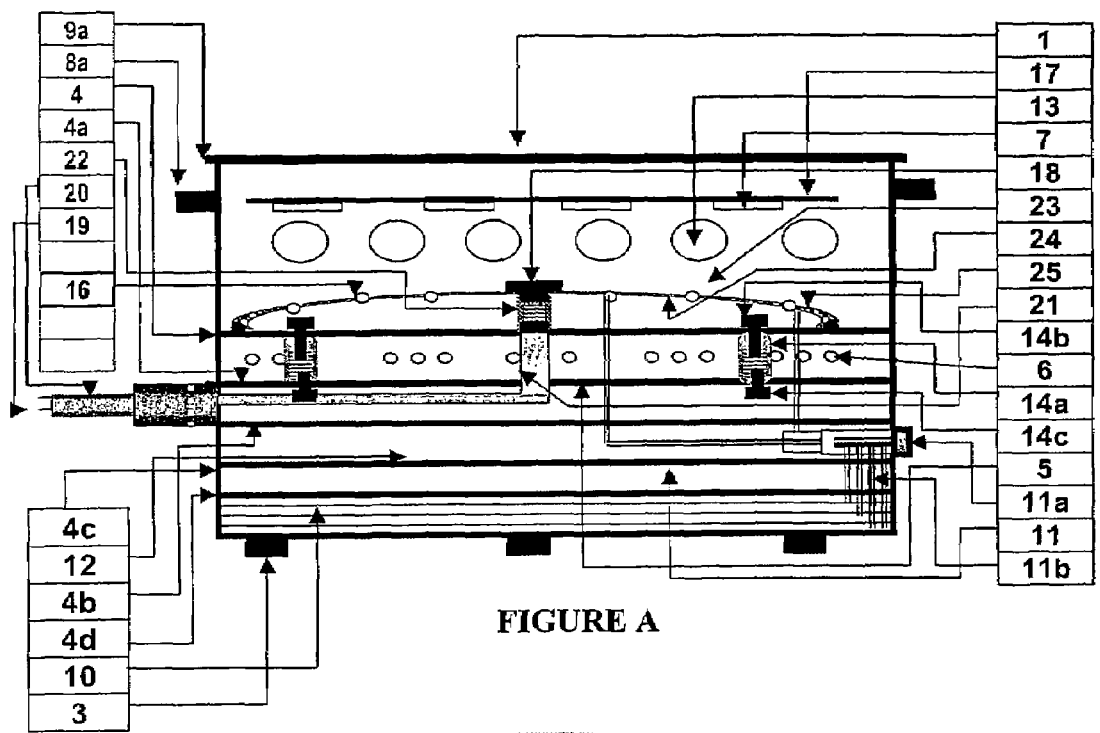
FIGURE A
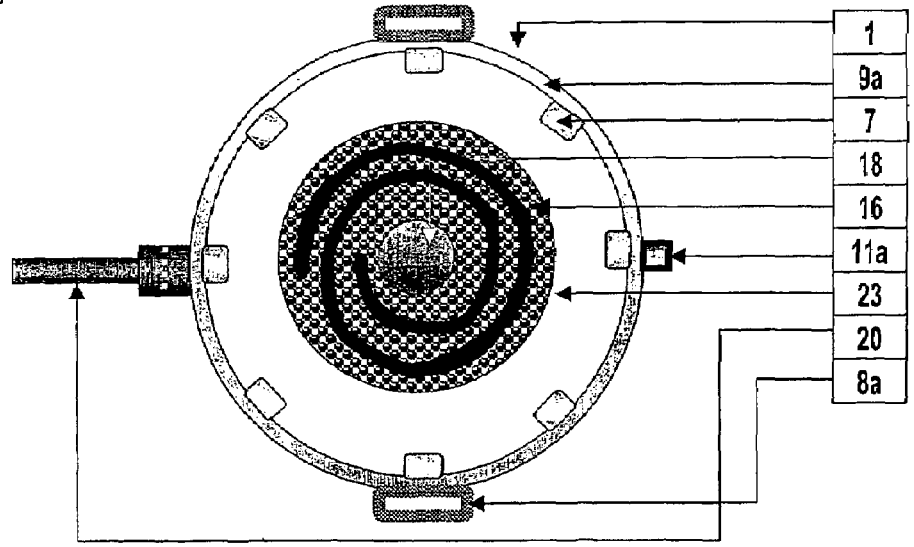
FIGURE B
DRAWING No 1

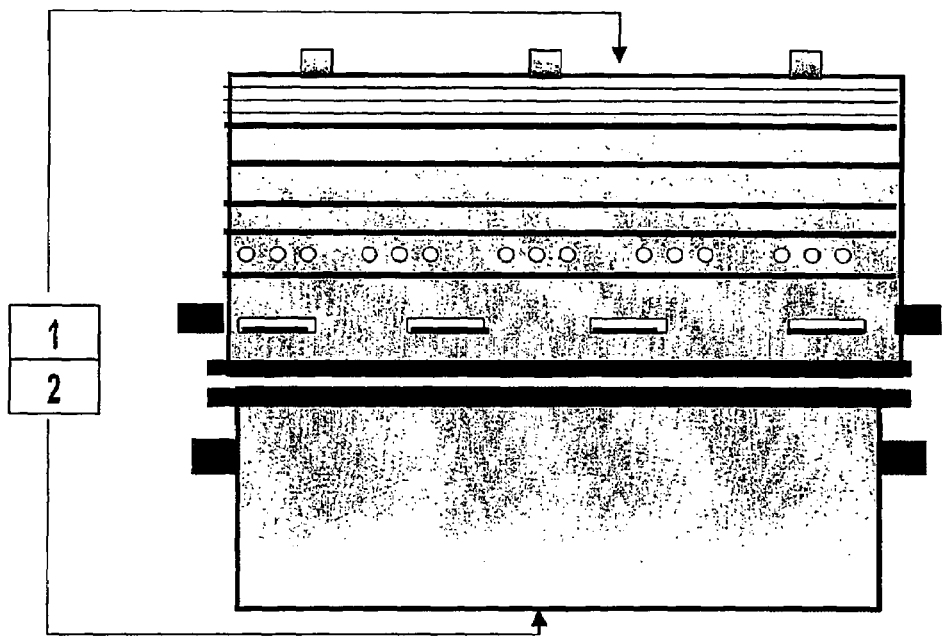
FIGURE A
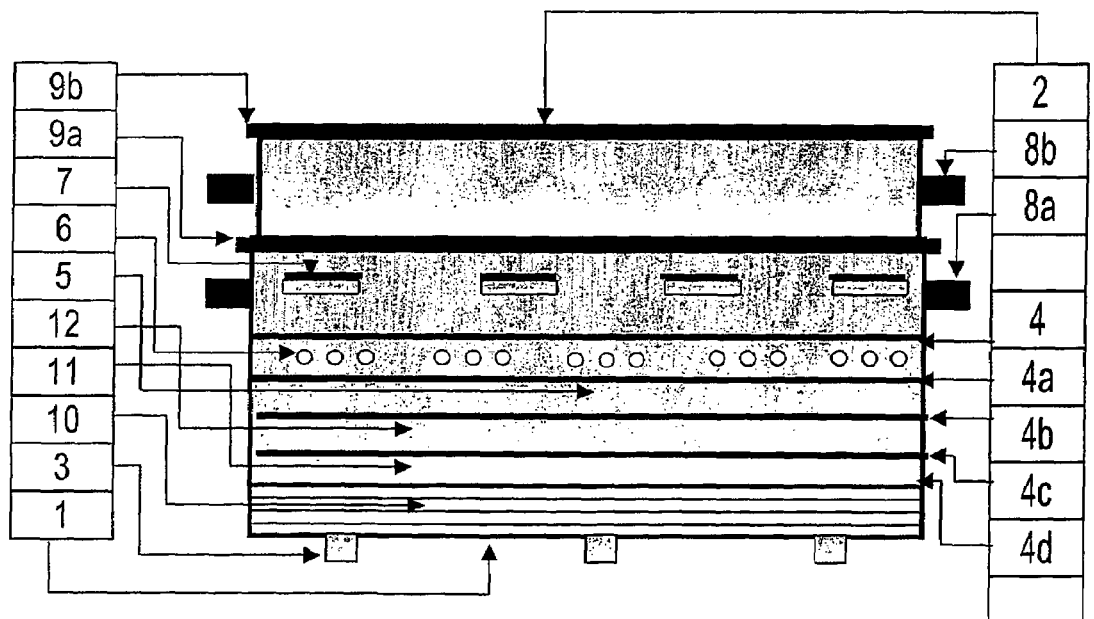
FIGURE B
DRAWING No 2

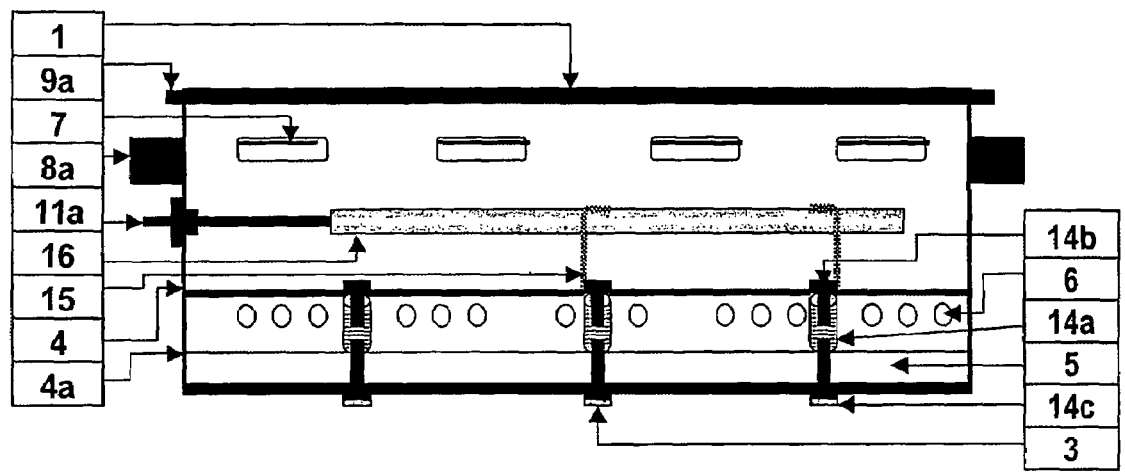
FIGURE A
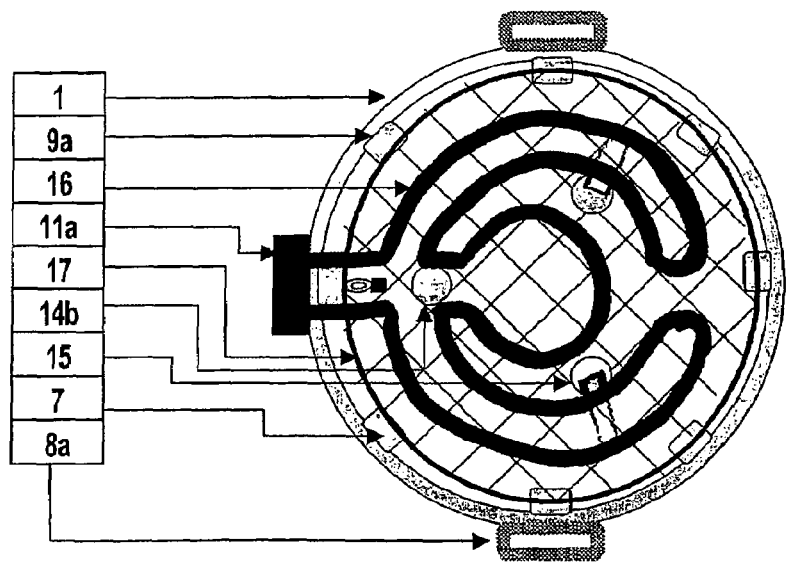
FIGURE B
DRAWING No 3

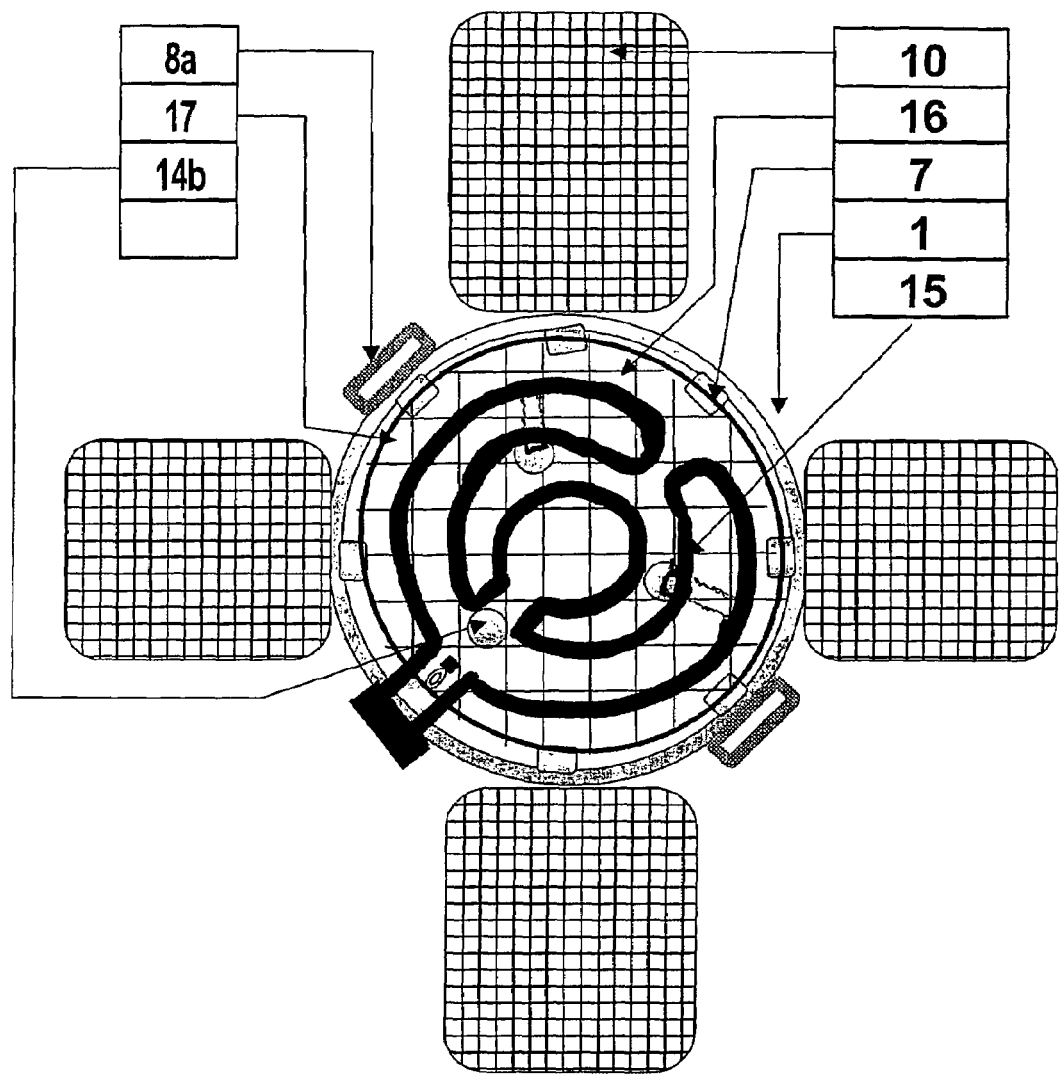
DRAWING No 4

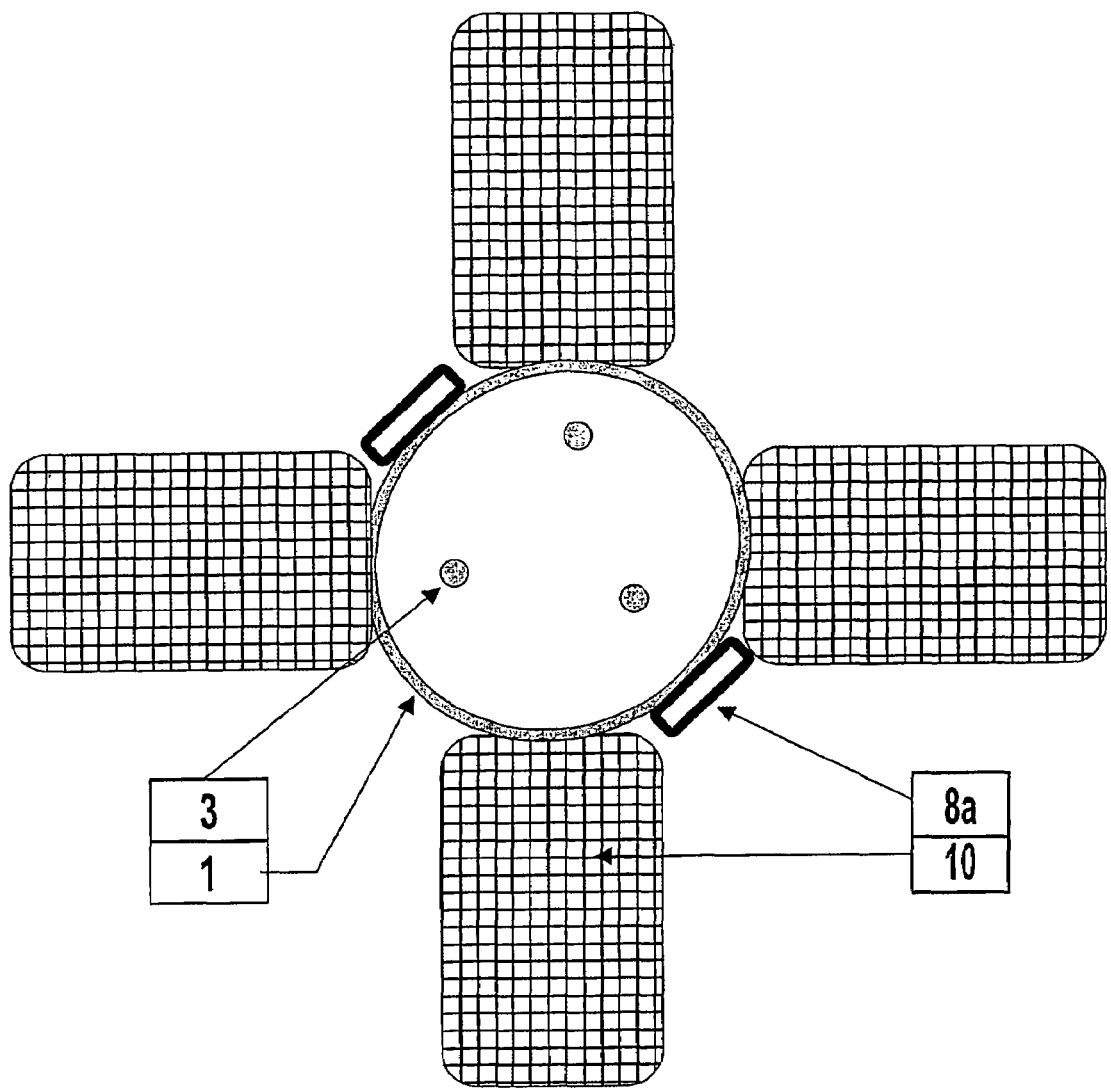
DRAWING No 5

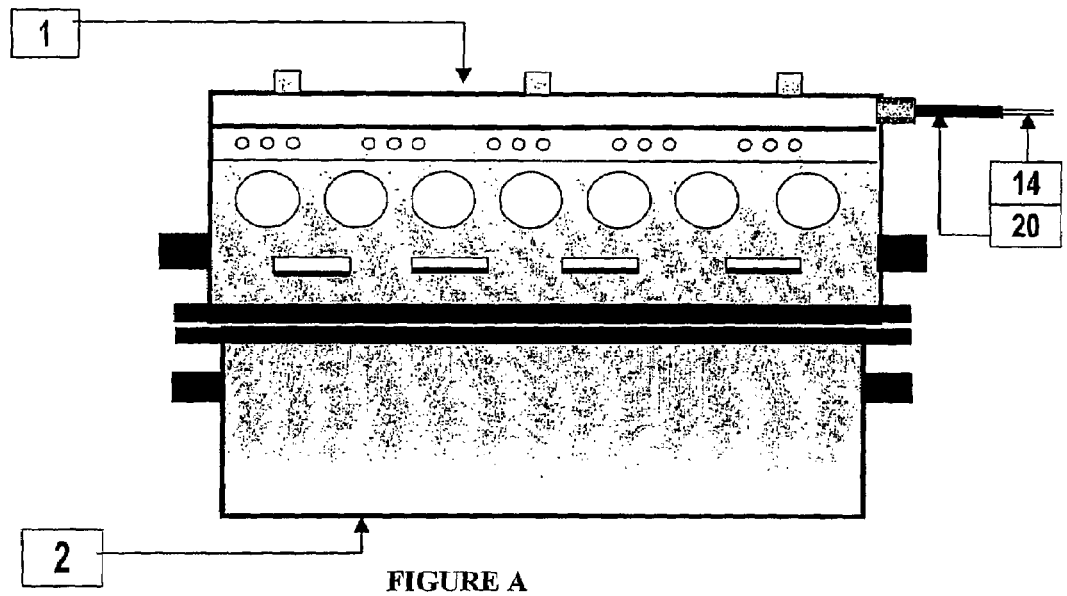
FIGURE A
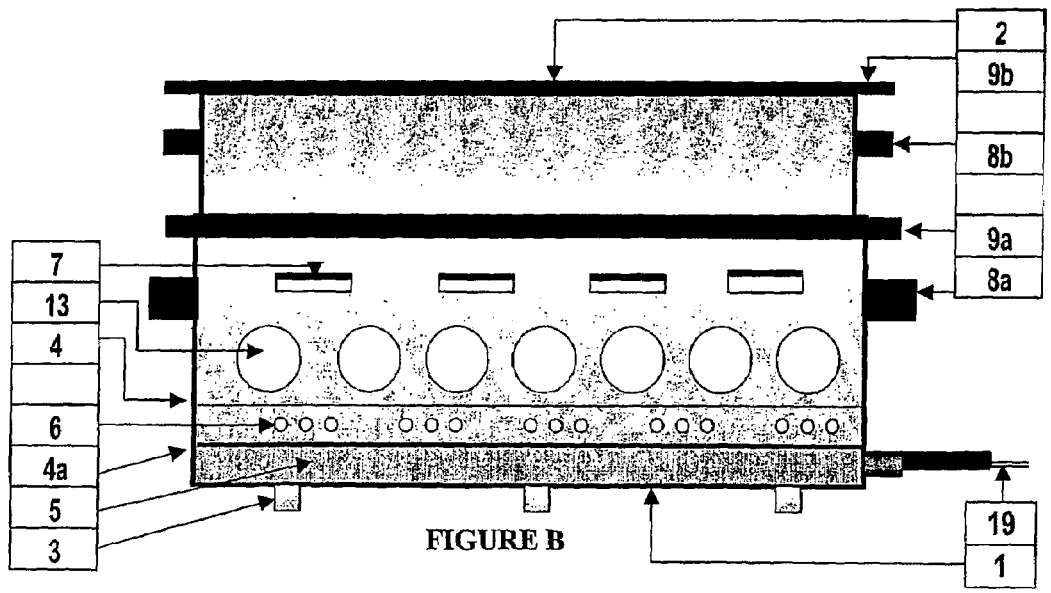
FIGURE B
DRAWING No 6

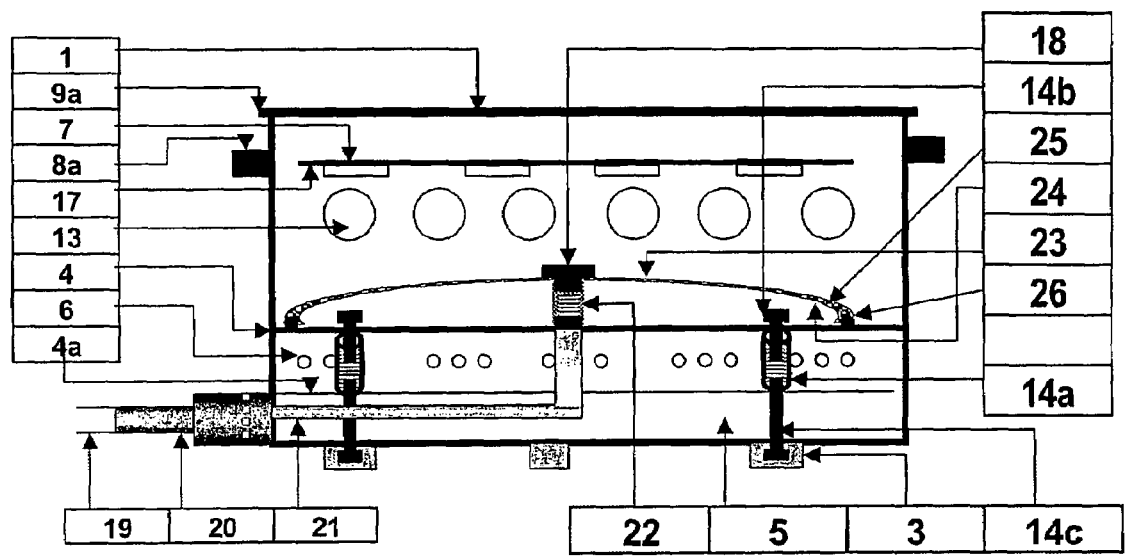
FIGURE A
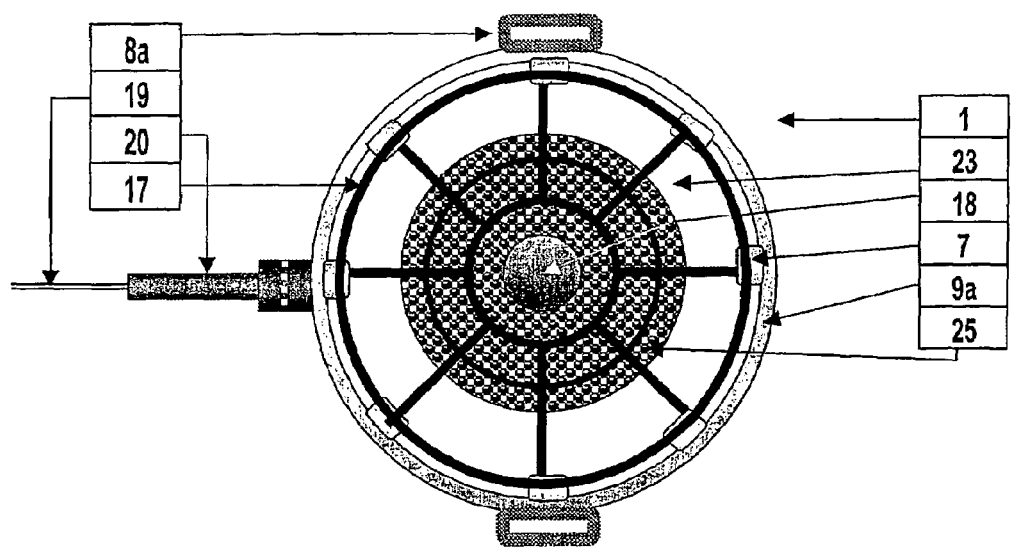
FIGURE B
DRAWING No 7

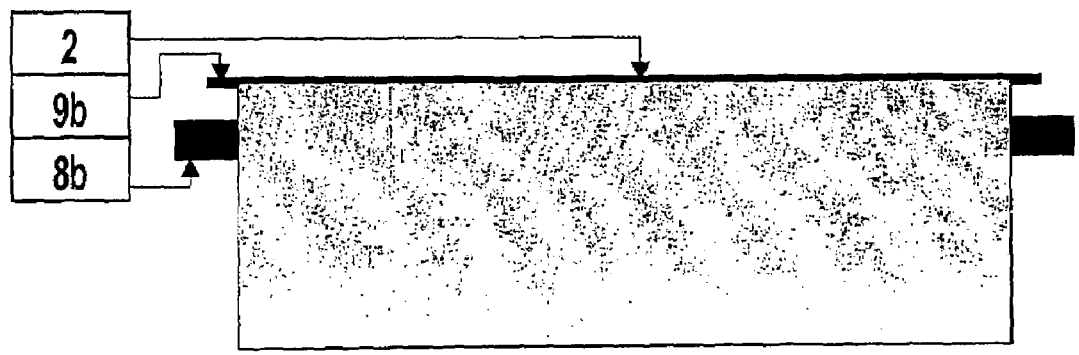
FIGURE A
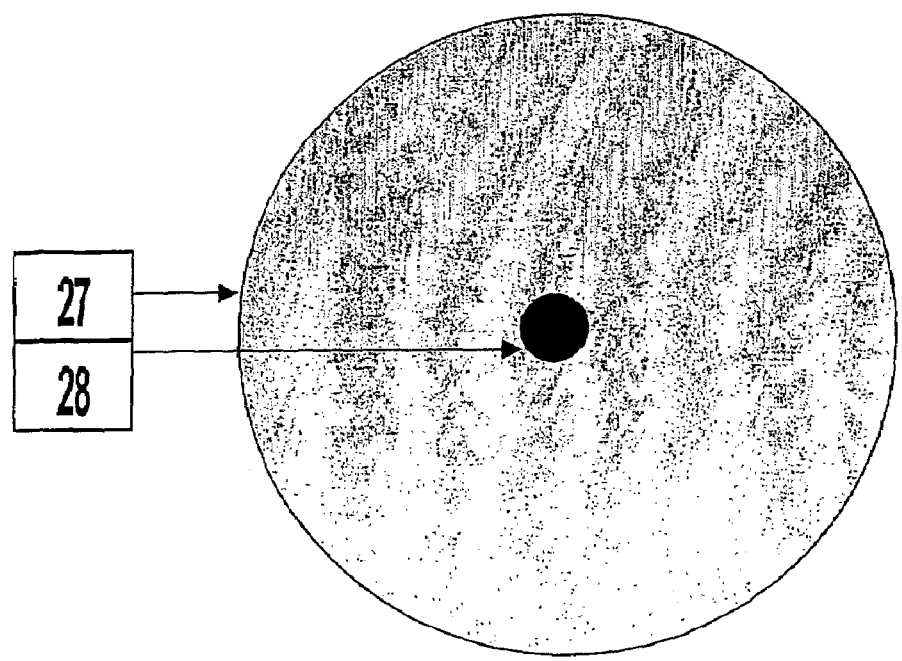
FIGURE B
DRAWING No 8

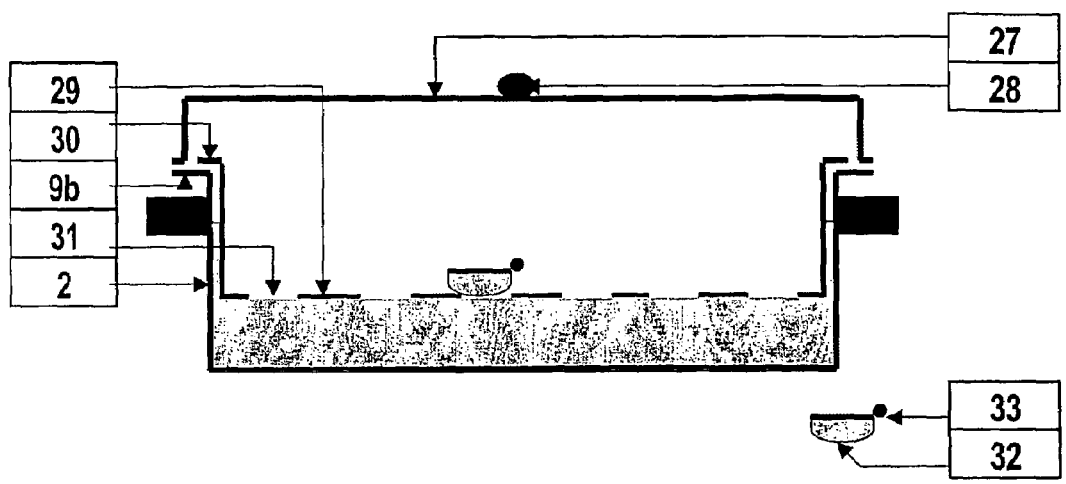
FIGURE A
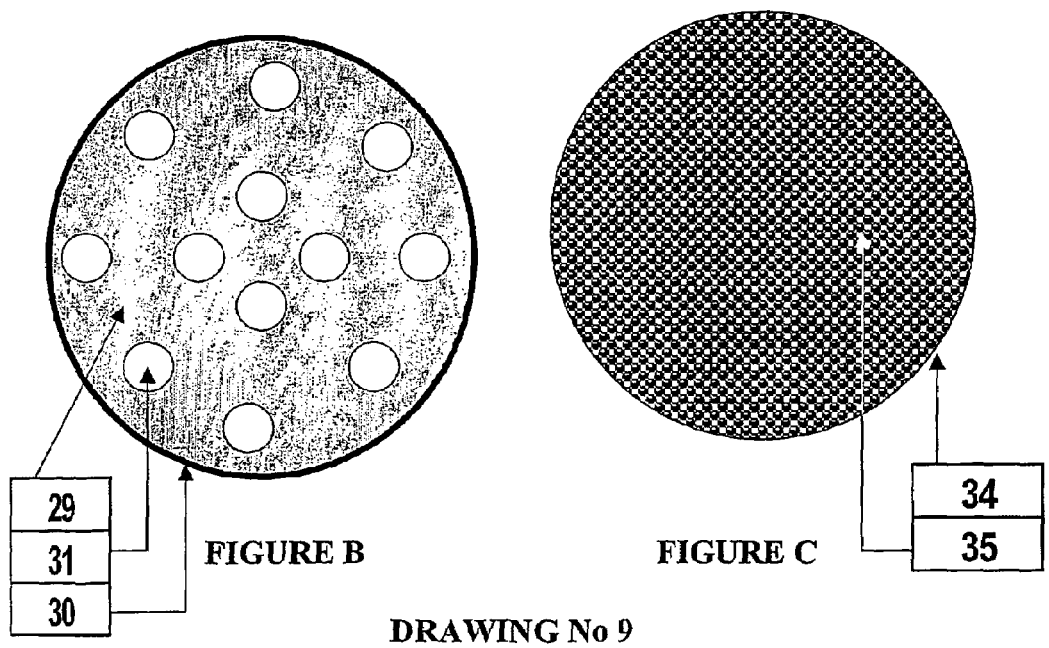
FIGURE B         FIGURE C
DRAWING No 9

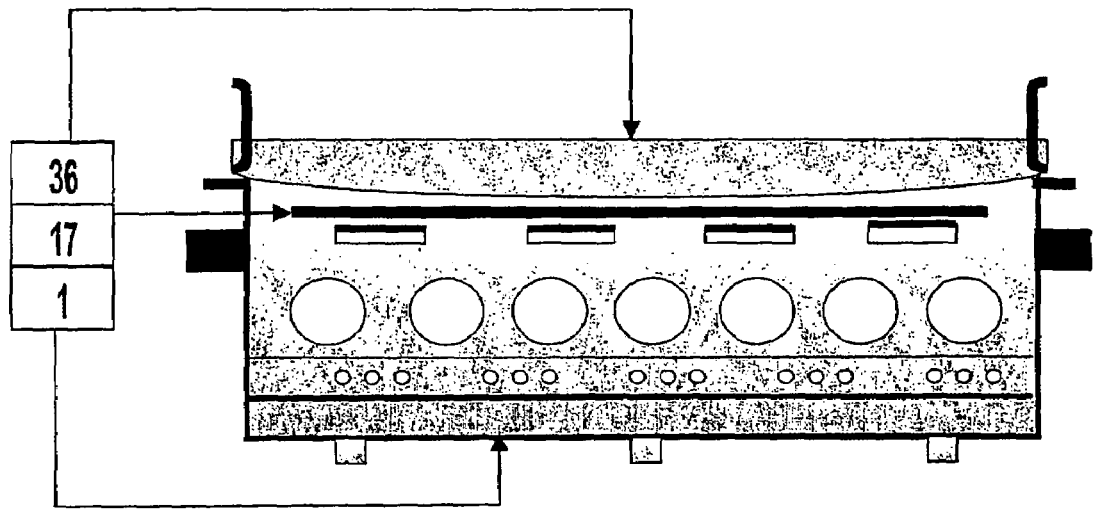
FIGURE A
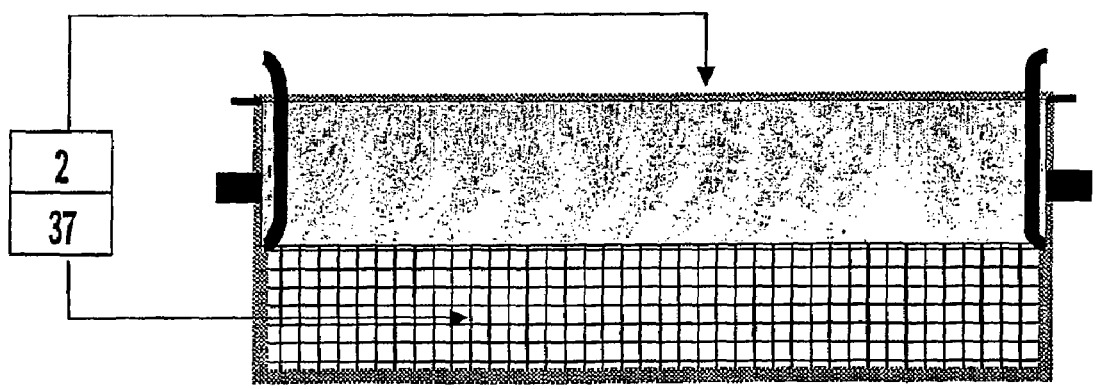
FIGURE B
DRAWING No 10

INTERCHANGEABLE MULTI-PURPOSE COOKING APPARATUS

The invention concerns an interchangeable multi-purpose cooking apparatus that can be used as a normal stove, a grill, a frying pan, a barbecue, a baker, a steamer, a poacher, a chip fryer, a fondue or a Chinese wok. With some small modifications it can be used as a pressure cooker or even as a lighting device or a heater.

Cooking apparatus for different methods of cooking are known from GB-A-760976, U.S. Pat. No. 3,641,926 and DE-U-0112694. But, a unique interchangeable multi-purpose cooking apparatus has been developed which is versatile and has the ability to perform individually almost all common cooking methods. It is an improved and more elaborate version of the electric grill pan, subject to ARIPO patent AP 264 and PCT application PCT/AP96/00002.

The interchangeable multi-purpose cooking apparatus is easy to operate and to clean. It can be a portable unit that is simply stored with the other kitchen appliances and can be used whenever and wherever it is desired. It is versatile and has the ability to carry out almost all common cooking methods. The interchangeable multi-purpose cooking apparatus can be of any suitable size or shape.

The interchangeable multi-purpose cooking apparatus, subject to the invention, contains a heating unit, consisting of a heating pan with different interchangeable heating mechanisms, a cooking pan with accessories to be mounted, on the cooking pan, that are all mutually interchangeable.

The heating unit is a heating pan comprising a heating mechanism and insulation for protection. The heating pan is either electrically heated or by burning a gaseous or liquid fuel. The electric power for the electrically heated pan is drawn from solar energy, or from a generator, or from the main electricity supply. The heating mechanisms are mutually interchangeable, or it may consist of a heating mechanism that can use electricity or gas within the same heating pan. Within this combination unit, it is understood that the heating pan has different compartments to house items such as the battery, the transformer, the solar panels, etc. These compartments may be within the heating pan as shown in Drawing No. 1, or may be separate attachments to the outer bottom of the heating pan, so that they may, be separated from the heating pan and placed in a more convenient place than the top of the heating compartment of the heating pan. The cooking pan fits into the heating pan. The heating pan, when put upside down fits upon the cooking pan, so that they are also in interchangeable positions.

The accessories comprise of:
  A grid,
  a lid which fixes into the cooking pan,
  a pan with large openings, fixing into the cooking pan,
  small cups, fitting into the large openings
  a plate with small openings that fits into the pan with large openings,
  a pan divider,
  a chip-frying basket,
  a Chinese wok
  Fondue forks The heating pan is provided with heat insulation at the inner or outer side of its heating compartments. A heat resistant structure or feet may be attached at the outer bottom of the heating pan to bear the pan when put down. Provision can be made to extend these feet i.e. by screwing extension legs on their foot ends, so that the heating pan is higher and thus easier to operate when using outside as a barbecue for instance.

Into the heating compartment of the heating pan, the interchangeable multi-purpose cooking apparatus heated electrically is installed an electric coil. The electric element can be 500 to 1200 Watts or whatever suitable wattage. The electric power can be supplied from the mains, from a generator or from solar energy. The power supply can be straight or regulated by a thermostat or time switch.

When heated by electric power supplied by solar panels, a battery and a transformer are installed at the bottom of the heating pan, and they are connected with appropriate wiring. Solar panels are installed in the bottom of the heating pan that can slide out and when exposed to sunlight, will charge the battery. The solar panels when out can be turned around so that the solar cells always face the sun. The solar panels may be removable so that they can be positioned at the most suitable place to receive solar energy. The charged battery by means of the transformer supplies electric power to the heating element in the heating pan.

Into the heating pan of the interchangeable multi-purpose cooking apparatus, heated by a fuel, are mounted the appropriate piping and burner. Also provisions can be made to attach a gas canister directly to the heating pan connected to the gas burner.

Within the combination unit, the heating mechanism may be adapted to accommodate an electric coil, as well as accommodating the gas burner attachments within the same heating compartment.

For using the interchangeable multi-purpose cooking apparatus as a grill, the heating pan is put upside down on the cooking pan. If heated by a fuel a structure is installed that reflects radiant heat downward from the heating pan into the cooking pan. The heating structure may be any suitable shape or size to suit the heating pan. Preferably this structure is a spherical dome, especially when the heating pan has a cylindrical shape. It is understood that the burning device has to be adapted to the kind of fuel used, or this device may consist of a mechanism which is fitted with both electrical as well as gas fuel heating devices. Also the burning device can be removed and replaced by a lighting device.

The interchangeable multi-purpose cooking apparatus can be of any suitable material, such as aluminium, stainless steel, mild steel, ceramics or glass and can be covered by a non-sticking material. A light may be installed in the cooking pan to follow the cooking operation if the heating pan is electrically heated and the cooking pan is made of glass or other transparent material.

It is understood that the interchangeable multi-purpose cooking apparatus can be of any suitable size or shape. However, to be portable, the heating pan should have a diameter of about 35 cm. The cooking pan is a little bit smaller to fit into the heating pan. The heating pan is about 7 cm high and the cooking pan is about 10 cm high. If the heating pan is a combination unit consisting of the solar-panel compartment, as well as the battery and transformer compartments, etc, the height of the heating pan may be determined by the accessories stored.

The interchangeable multi-purpose cooking apparatus and some accessories are portrayed in the Drawings No. 1-10.

Drawing No. 1 shows the front view of the interchangeable multi-purpose cooking apparatus heated by electric power, supplied by either solar or mains, as well as gas as a combination within one heating pan.
  in Figure A, is a cross-section view
  in Figure B is a top view.

Drawing No. 2 shows the front views of the interchangeable multi-purpose cooking apparatus heated by electric power.

in Figure A for using as a grill,
in Figure B for using as a cooker
Drawing No. 3 shows the electric heated heating pan:
in figure A a cross section, and
in Figure B a top view.
Drawing No. 4 shows a top view of the heating pan used as a cooker when heated by solar energy
Drawing No. 5 shows a top view of the heating pan used as a grill when heated by solar energy.
Drawing No. 6 shows front views of the interchangeable multi-purpose cooking apparatus heated by a fuel.
in Figure A for using as a grill, and
in Figure B for using as a cooker.
Drawing No. 7 shows the heating pan heated by a gaseous fuel:
in Figure A, a cross section
in Figure B a top view
Drawing No. 8 shows:
in Figure A, a cross section of the cooking pan, and
in Figure B a top view of the lid.
Drawing No. 9 shows the accessories for poaching and steaming.
in Figure A, a cross section of the poaching pan with a cup, put onto the cooking pan
in Figure B, a top view of the poaching pan, and
in Figure C, a top view of the steaming disc.
Drawing No. 10 shows other functions
in Figure A, for use as a Chinese wok, and
in Figure B, for deep frying.

Drawing No. 1 portrays the interchangeable multi-purpose cooking apparatus where the heating mechanism can use electricity or gas within the same heating pan.

In Figure A is shown a cross section of the gas and electric combination heated heating pan (1) and within the heating pan (1) separating the different compartments at different levels of the heating pan (1) are metal plates (4), (4a), (4b), (4c), (4d) which are attached to the inner wall of the heating pan (1). These compartments house the solar panels (10), the battery (11), transformer (12). Connecting all the electrical components is appropriate insulated wire cording (11b). Closer to the heating mechanism is a compartment with empty space for cooling which is created by a nut (14a) and is air-ventilated by openings (6) through the heating pan (1). Bolts (14b) and (14c) are screwed into either ends of the long nut (14a). For better insulation, Bolts (14b) and (14c) do not directly touch each other, but leave a space within the nut (14a). The heads of the bolts (14b) are screwed firmly with washers to the metal plate (4). The heads of the bolts (14c) are screwed firmly with washers to the metal plate (4a) separating the insulation compartment with insulation material (5), from the empty space. Separating the insulation compartment from the transformer (12) is metal plate (4b). Separating the transformer (12) from the battery (11) is metal plate (4c). Separating the battery (11) from the solar panels (10) is the metal plate (4d). Appropriate openings are made in all the metal plates (4), (4a) (4b), (4c), (4d) to accommodate the appropriate wiring. The top of the heating pan (1) has a flange (9a) that serves as a support for the heating pan (1) when it is put up-side-down on the flange (9b) of the cooking pan (2) for grilling. Two heat resistant handles (8a) are fixed onto the outer wall of the heating pan (1). Into the side wall of the heating pan (1), just above the gas burner (18) are punched protrusions (7). These protrusions (7) serve as supports either for the cooling pan (2) or for the grid (17) when used for other cooking methods. The side wall for the heating pan (1) at the burner (18) height has big openings (13) to provide for enough air supply. Gas is admitted through a pipe (19) which passes through a handle (20) containing a gas jet. This handle (20) pierces through the outer wall of the heating pan (1) and connected to the handle (20) is a pipe (21) which passes through the insulation material (5). The gas is jetted into the heating pan (1) via pipe (21). This pipe (21) then passes centrally through the metal plates (4a) and (4). The pipe (21) is screwed into the tube (22) which is centrally situated in the heating compartment of the heating pan (1) and the spherical dome (23). The gas burner (18) passes through the centre of the spherical dome (23) and screws into the tube (22) attaching the spherical dome (23) firmly to the metal plate (4) within the heating compartment of the heating pan (1). The spherical dome (23) is mounted into the heating pan (1) to reflect radiant heat downwards when the heating pan (1) is put up-side-down on the cooking pan (2). The spherical dome (23) consists of a solid metal plate (24) and a perforated plate (25). The perforated metal plate (25) is attached to the top of the solid metal plate (24) by a solid wire (26) forming the dome (23). The bottom solid plate (24) acts as a heat resistor to the rest of the heating unit as well as a heating reflector. The perforated plate (25) on top absorbs heat and creates radiant heat for grilling. When using solar energy, the solar panels (10) slide out of the heating pan (1) and are exposed to the sunlight in order to charge the battery (11). It also shows the electric element (16) embedded in the perforated plate (25) and is coiled around with the electric elements cold ends passing through the dome (23) the metal plate (4) through the empty space, through metal plate (4a) then through insulating material (5) and finally through metal plate (4b) and connect into the transformer (12) where they will receive power from either the battery (11) or mains (11a). A wire cording (11b) connects the electric element (16), the mains (11a), the transformer (12), the battery (11) and solar panels (10). This wire cording (11b) may have appropriate insulation and length as necessary.

In Figure B shows a top view of the heating pan (1) with flange (9a) and handles (8a), the heating pan protrusions (7) and gas handle (20) and the mains (11a). Centrally situated within the heating pan (1) is spherical dome (23) with the gas burner (18) and the electric element (16) coiled around the spherical dome (23).

Drawing No. 2 portrays the portable electric heated interchangeable multi-purpose cooking apparatus heated by electric power provided by mains or solar energy.

Figure A grilling with the heating pan (1) put upside down on top of the cooking pan (2).

Figure B as a cooking pan for carrying out other cooking operations, with the cooking pan (2) placed into the heating pan (1). On the outer bottom of the heating pan (1) is mounted small heat resistant feet (3). The heating pan (1) has a heating compartment which is separated by a metal plate (4) and between metal plate (4) and metal plate (4a) is an empty space, provided with openings (6) punched into the wall of the heating pan (1) for air ventilation. Metal plate (4a) separates the empty space from the insulation material (5). Metal plate (4b) separates the transformer (12) from the insulation material (5), and metal plate (4c) separates the battery (11) from the transformer (12). Metal (4d) separates the battery (11) from the solar panels (10). The heating pan has protrusions (7) pressed into the side wall to support the cooking pan (2) or the grid (17). Heat resistant handles (8a) and (8b) and flanges (9a) and (9b) are provided respectively with the heating pan (1) and the cooking pan (2). On the bottom of the heating pan are installed four solar panels (10), the battery (11) and the transformer (12). The solar panels (10) slide out from the solar panel compartment of the heating pan (1), to be used when the cooking pan (2) is heated by solar energy.

Drawing No. 3 represents details of the heating pan, heated by electric power.

Figure A shows a cross section of the electric heating pan (1). It consists of a heating compartment, and air-ventilated compartment, which is empty, and an insulated compartment with insulating material (5). Within the heating compartment on the side wall of heating pan (1) are punched protrusions (7) which are situated just above the electric element. These protrusions (7) serve as supports either for the cooking pan (2) or for the grid (17) when used for other cooking methods. The electric element (16) is also mounted centrally within the heating compartment and is supported by metal clips (15) which are flexible so that they can be effortlessly bent to hold or release the electric element (16). The electric element cold end is connected through the wall of the heating pan (1) to the mains connection (11a). The bolts (14b) pass through the metal clips (15) which act as a washer then through the metal plate (4) and screws into the long nut (14a) which creates the empty space between the metal plate (4) and metal plate (4a). The empty space is air-ventilated by openings (6). Between metal plate (4a) and the inner bottom of the heating pan (1) is a compartment filled with insulation material (5). The bolts (14c) pass through the outer bottom of the heating pan (1) through the insulation material (5) and through the metal plate (4a) and screws into the long nut (14a). At the ends of this bolt (14c) which is on the outer bottom of the heating pan (1) are small heat resistant feet (3). The bolts (14b) and (14c) are screwed into either end of the long nut (14a) but do not directly touch each other, but leave a space within the nut (14a) for better insulation for the heat resistant feet (3). The heating pan (1) has a flange (9a) which serves as a support for heating pan (1) when it is put up-side-down on the flange (9b) of the cooking pan (2) for grilling. Two heat resistant handles (8a) are fixed onto the outer walls of heating pan (1) for safe handling.

Figure B shows a top view of the electric heated heating pan (1). It shows the flange (9a), the electric coil (16) the clips (15), the heads of the bolts (14b), the grid (17), put into the heating pan (1) upon the protrusions (7), the mains connection (11a) and the two heat resistant handles (8a).

Drawing No. 4 portrays a top view of the heating pan (1) heated by solar energy and used as a cooker. The solar panels (10) slide out of the heating pan (1) and are directed towards sunlight in order to charge the battery.

It shows the electric coil (16), the clips (15), the heads of the bolt (14b), the grid (17), put into the heating pan (1) upon the protrusions (7), and the two heat resistant handles (8a).

Drawing No. 5 portrays a top view of the heating pan (1) used as a grill and heated by solar energy. The solar panels (10) slide out from the heating pan (1) and are turned to face the sun so that the cells absorb solar energy.

It shows the heat resistant feet (3), the solar panels (10) the flange (9a) and the two heat resistant handles (8a).

Drawing No. 6 portrays the interchangeable multi-purpose cooking apparatus heated by a fuel Figure A—a grill with the heating pan (1) put upside down on top of the cooking pan (2).

In Figure B as a cooking pan for carrying out other cooking operations, with the cooking pan (2) put into the heating pan (1). The cooking pan (2) rests upon the protrusions (7) which are punched into the walls of the heating pan (1). Large openings (13) allow adequate air-flow to the burner (18). Metal plate (4) separates the heating compartment from the empty space, air-ventilated by openings (6) and metal plate (4a) separates the empty space from the insulating compartment with insulation material (5). On the outer bottom of the heating pan are heat resistant feet (3). Gas is admitted through pipe (19), which passes through a handle (20) containing a gas jet. This handle (20) pierces through the outer wall of the heating pan (1).

Drawing No. 7 portrays details of the heating pan (1) heated by gaseous fuel.

In Figure A is shown a cross section of the gas heated heating pan (1) which has three main compartments: the heating compartment, the empty space air-ventilated compartment and the insulating compartment. The heating compartment within the heating pan (1) is provided with a heating mechanism which is made out of a spherical dome (23) which consists of a solid metal plate (24) and a perforated plate (25). The two are attached together by a solid wire (26) forming the dome (23). The bottom of the solid plate (24) acts as a heat resistor to the rest of the heating unit as well as a heat reflector. The perforated plate (25) on top absorbs heat and creates radiant heat for grilling when the heating pan (1) is placed on top of the cooking pan (2). The dome (23) has a central hole allowing the burner (18) to pass through and screw into the tube (22). This tube (22) is centrally situated between the dome (23) and the metal plate (4) and acts also as a spacer between the two. Below the metal plate (4) is an empty space created by nuts (14a) and bolts (14b) and (14c). This empty space is between the metal plates (4) and (4a). On the outer wall of the empty space section of the heating pan (1) are openings (6) for air-ventilation. Between plate (4a) and the bottom of the inner heating pan (1) is situated the insulating compartment with insulation material (5). Gas is admitted through a pipe (19) which passes through a handle (20) containing a gas jet. This handle (20) pierces through the outer wall of the heating pan (1) and connected to the handle (20) is a pipe (21) which passes through the insulation material (5). The gas is jetted into the heating pan (1) via pipe (21). This pipe (21) then passes centrally through the metal plates (4a) and (4). The pipe (21) is screwed into the tube (22) which is centrally situated in the heating compartment of the heating pan (1) and the spherical dome (23). The gas burner (18) passes through the centre of the spherical dome (23) and screws into the tube (22) attaching the spherical dome (23) firmly to the metal plate (4) within the heating compartment of the heating pan (1). Large openings (13) are provided within the heating unit of the heating pan to allow adequate air supply to the burner (18). Protrusions (7) are provided just above large openings (13) to provide support to the cooking pan (2) or grid (17). On top of the heating pan (1) flange (9a) is shown, and heat resistant handles (8a) are provided for safe handling. The bolts (14c) pass through the bottom of the heating pan (1), through the insulation material (5), through the metal plate (4a) and screw into the bottom of the long nut (14a). Onto the head of the bolts (14c) are attached heat-resistant feet (3).

In Figure B—is a top view of the fuel heated heating pan (1) showing the perforated spherical dome (23) the gas burner (18) the gas pipe (19) the handle with jet (20) the grid (17) put into the heating pan (1) upon the protrusions (7) the heat resistant handles (8a) and the flange (9a) on top of the heating pan (1).

Drawing No. 8 portrays:

In Figure A a cross section of the cooking pan (2) with a flange (9b) at the top and two heat resistant handles (8b) on the side wall.

In Figure B a top view of the lid (27) for the cooking pan (2) with a heat resistant knob (28) in the centre. The lid (27) is put upon the cooking pan (2) whenever appropriate.

By installing clips on the rim of the lid that fits upon the flange of the cooking pan, the latter can be used as a pressure cooker by firmly closing the clips. It will be preferable to use a rubber seal ring to have a good closure.

Drawing No. 9 illustrates the accessories for poaching eggs and steaming.

In figure A is shown a cross section of the poaching pan (29) inserted into the cooking pan (2). The poaching pan (29) has a flange (30), which rests upon the flange (9b) of the cooking pan (2). On the bottom of the poaching pan (29) are large openings (31). The poaching cups (32) are provided with long handles (33) and fit into the large openings (31). On top of the cooking pan (2) enclosing the poaching pan (29) and resting on flange (9b). is the lid (27) with a heat resistant knob (28).

In Figure B is shown the bottom of the poaching pan (29) with the large openings (31) and the flange (30).

In figure C is illustrated a steamer plate that is a disc (34) fitting into the pan with large openings (29) and has small holes (35) all over the surface. The disc (34) is laid down upon the bottom of the pan with large openings (29). The disc (34) will stay down by the weight of the food to be steamed and the divider, if used.

Drawing No. 10 illustrates some other uses of the interchangeable multi-purpose cooking apparatus.

Figure A portrays the use as a Chinese wok (36) on a gas heated heating pan (1), resting on grid (17), and Figure B portrays a deep-fry basket (37) which can be put into the cooking pan (2) for deep-frying.

According to the cooking procedure the following configuration of the interchangeable multi-purpose cooking apparatus is installed.

For grilling: the heating pan is put upside down upon the cooking pan and the grid is put on the bottom of the cooking pan.

For other methods of cooking: The grid may be installed into the heating pan converting the heating pan into a normal stove. Alternatively the cooking pan is installed into the heating pan and the lid may be put on top of the cooking pan.

Poaching is carried out by installing the cooking pan into the heating pan, the poaching pan into the cooking pan. Within the large openings of the poaching pan are installed the poaching cups and the lid is put on top of the cooking pan.

It is understood that the Drawings, measurements and shapes given are exclusively illustrative.

Also other accessories can be added, such as a divider when steaming, to have separate steaming sections. On the grid can be put fire stones for a barbecue or any other pot. The heating pan and cooking pan can also be used as a fondue set by providing fondue skewers or as a baker. It will also be possible, when camping and the heating is provided by fuel, to replace the burner head of the heating pan with a lighting lamp and to use the heating pan as a lighting device, or as a heater.

Although preferred embodiments of the present invention has been mentioned, it will be appreciated by those skilled in the art, that variations may be made thereto, without departing from the spirit of the invention or the scope of the appended claims. For instance, some of the heating means of the heating pan can be deleted or the heating unit can be limited to only one heating pan heated by electric power or by burning a fuel or a combination of both.

The invention claimed is:

1. A multi-purpose cooking apparatus comprising:
   a heating unit and a cooking pan,
   said heating unit comprising a heating pan having a plurality of different interchangeable heating mechanisms contained therein,
   said cooking pan having a plurality of interchangeable accessories mounted thereon, wherein:
   said cooking pan and said heating pan are adapted so that in a first configuration said cooking pan fits into said heating pan when said heating pan is in a first orientation and, in a second configuration, said heating pan fits on said cooking pan when said heating pan is in an upside down orientation relative to said first orientation, so that the apparatus may be used for grilling in said second configuration; and
   wherein the accessories comprise:
   a lid adapted to fit upon said cooking pan;
   a grid adapted to fit into said cooking pan and into said heating pan;
   a pan formed with a plurality of first openings;
   cups adapted to fit into said openings; and
   a disc formed with a plurality of second openings, larger than said first openings, said disc being adapted to fit into said pan.

2. The multi-purpose cooking apparatus according to claim 1, wherein said interchangeable heating mechanisms comprise one or more of:
   an electrical element;
   means for burning a gaseous or liquid fuel; or
   solar panels.

3. The multi-purpose cooking apparatus according to claim 1, wherein the heating mechanism includes means for utilizing electricity and means for utilizing gas, both said means being located within said heating pan.

4. A multi-purpose cooking apparatus according to claim 1 wherein said heating pan further comprises:
   a plurality of protrusions, located on a side of said heating pan close to said heating mechanism, to hold said grid or said cooking pan,
   a flange located on a top of said heating pan to hold said heating pan when placed on top of said cooking pan,
   insulation attached to an inner or outer bottom of the heating pan, and a plurality of heat resistant feet located on said outer bottom to provide support.

5. A multi-purpose cooking apparatus according to claim 4, wherein said heating pan is divided into a lower and an upper section by a metal plate wherein said lower section is filled with insulation material and said upper section is formed with small openings in a wall thereof, wherein a first bolt (14a) passes through said insulation material and through said metal plate into one end of a long nut and wherein a second bolt is screwed into an opposing end of the long nut.

6. A multi-purpose cooking apparatus according to claim 5, wherein the heating mechanism comprises an electric regulated coil having a rating of 500 to 1200 watt or more, said coil being mounted into the heating pan by means of a plurality of flexible clips wherein a first end of each clip acts as a washer for said second bolt and wherein a second end of each clip holds the electric coil in position.

7. A multi-purpose cooking apparatus according to claim 6, wherein said heating pan further comprises solar panels adapted to slide out and into the bottom of said heating pan, said solar panel being adapted to be orientated so that they always face the sun and wherein said solar panels are removable so as to be positioned in the most suitable place to receive solar energy.

8. A multi-purpose cooking apparatus according to claim 4, wherein said heating pan is adapted to use a fuel that creates a naked flame, said cooking apparatus further comprising a structure adapted to radiate heat, wherein a side wall of the heating pan is formed with a plurality of third openings.

9. A multi-purpose cooking apparatus according to claim 8, wherein said structure comprises a first dome comprised of solid metal, a second dome comprised of perforated metal mounted on said first dome and located a distance therefrom, wherein a base of a fuel burner head is located so that is passes centrally through the first dome and screws into a tube securing the first dome to the fuel burner head, said structure further comprising a gas pipe screwed into a first end of the tube, said gas pipe being located so that it passes centrally through a bottom of the heating pan thereby securing the heating mechanism to the heating pan, said cooking apparatus being further arranged so that said gas pipe passes centrally through said upper section, said metal plate, said insulation material and through an outer wall of said heating pan, said gas pipe being joined to a gas jet, said gas jet being adapted to be screwed into a handle, and said gas jet being further adapted so that a fuel supply pipe may be attached thereto.

* * * * *